(12) United States Patent
Shake et al.

(10) Patent No.: US 10,906,271 B2
(45) Date of Patent: Feb. 2, 2021

(54) EXTERIOR SHEATHING PANEL WITH INTEGRATED AIR/WATER BARRIER MEMBRANE

(71) Applicant: United States Gypsum Company, Chicago, IL (US)

(72) Inventors: Michael P. Shake, Johnsburg, IL (US); Robert H. Negri, Lake Villa, IL (US); Paula McKnight, Orland Park, IL (US); Paul Shipp, Libertyville, IL (US); James M. Ullett, McHenry, IL (US); Timothy G. Kenny, Antioch, IL (US); Brett R. Link, Algonquin, IL (US); Pamela Hernandez, Medina, OH (US); Kristin Schulte, Cleveland, OH (US); Dante Marimpietri, Mentor, OH (US); Casey Sovey, Kirtland, OH (US); Muneer Mohammad, Brunswick, OH (US); Dominic Cremona, Parma, OH (US); Ellen Zerucha, Beachwood, OH (US); Scottie Lee Stinson, Frisco, TX (US)

(73) Assignees: UNITED STATES GYPSUM COMPANY, Chicago, IL (US); TREMCO INCORPORATED, Beachwood, OH (US)

( * ) Notice: Subject to any disclaimer, the term of this patent is extended or adjusted under 35 U.S.C. 154(b) by 0 days.

(21) Appl. No.: 16/734,867

(22) Filed: Jan. 6, 2020

(65) Prior Publication Data
US 2020/0171797 A1 Jun. 4, 2020

Related U.S. Application Data

(62) Division of application No. 14/198,093, filed on Mar. 5, 2014, now Pat. No. 10,562,271.
(Continued)

(51) Int. Cl.
*C04B 41/45* (2006.01)
*B32B 17/06* (2006.01)
(Continued)

(52) U.S. Cl.
CPC .............. *B32B 17/06* (2013.01); *B32B 13/04* (2013.01); *B32B 13/12* (2013.01); *B32B 13/14* (2013.01);
(Continued)

(58) Field of Classification Search
CPC ............ C04B 41/4501; C04B 41/4521; C04B 41/4535; C04B 41/4543; C04B 41/483;
(Continued)

(56) References Cited

U.S. PATENT DOCUMENTS 3,847,654 A * 11/1974 Althouse ............. C08L 2666/02
428/147
5,220,762 A 6/1993 Lehnert et al.
(Continued)

FOREIGN PATENT DOCUMENTS

CH 584824 12/1976
CH 584924 2/1977
(Continued)

OTHER PUBLICATIONS

Oldcastle BuildingEnvelope Inc., "Method and System for Insulating Structural Building Components" in Patent Application Approval Process; Politics & Government Week, Dec. 26, 2013; http://global.factiva.com/hp/printsavews.aspx?pp=Print&hc=All.
(Continued)

*Primary Examiner* — Nathan H Empie
(74) *Attorney, Agent, or Firm* — Greer, Burns & Crain, Ltd.; Philip T. Petti; Pradip Sahu

(57) ABSTRACT

An exterior sheathing cementitious panel which prevents water penetration and air leakage is provided. Methods for
(Continued)

manufacturing exterior sheathing cementitious panels with a highly efficient integrated air/water barrier membrane are provided as well.

20 Claims, 2 Drawing Sheets

Related U.S. Application Data

(60) Provisional application No. 61/792,545, filed on Mar. 15, 2013.

(51) Int. Cl.
| | | |
|---|---|---|
| *B32B 13/04* | (2006.01) | |
| *B32B 13/14* | (2006.01) | |
| *B32B 13/12* | (2006.01) | |
| *E04C 2/04* | (2006.01) | |
| *E04C 2/288* | (2006.01) | |
| *C04B 28/14* | (2006.01) | |
| *C04B 28/04* | (2006.01) | |
| *C04B 41/48* | (2006.01) | |
| *C04B 41/49* | (2006.01) | |
| *C04B 41/50* | (2006.01) | |
| *C04B 111/27* | (2006.01) | |
| *C04B 111/00* | (2006.01) | |

(52) U.S. Cl.
CPC .............. *C04B 28/04* (2013.01); *C04B 28/14* (2013.01); *C04B 41/4501* (2013.01); *C04B 41/4521* (2013.01); *C04B 41/4535* (2013.01); *C04B 41/4543* (2013.01); *C04B 41/483* (2013.01); *C04B 41/4853* (2013.01); *C04B 41/4876* (2013.01); *C04B 41/4884* (2013.01); *C04B 41/4961* (2013.01); *C04B 41/50* (2013.01); *C04B 41/5049* (2013.01); *E04C 2/049* (2013.01); *E04C 2/288* (2013.01); *C04B 2111/0062* (2013.01); *C04B 2111/27* (2013.01); *Y10T 428/249921* (2015.04); *Y10T 428/269* (2015.01)

(58) Field of Classification Search
CPC ............ C04B 41/4853; C04B 41/4876; C04B 41/4884; C04B 41/4961; C04B 41/50; C04B 41/5049
See application file for complete search history.

(56) References Cited

U.S. PATENT DOCUMENTS

| | | |
|---|---|---|
| 5,397,631 A | 3/1995 | Green et al. |
| 5,552,187 A * | 9/1996 | Green ................... B32B 13/02 |
| | | 427/389.8 |
| 5,643,510 A | 7/1997 | Sucech |
| 6,045,871 A | 4/2000 | Matt |
| 6,410,118 B1 | 6/2002 | Reicherts et al. |
| 6,746,781 B2 | 6/2004 | Francis et al. |
| 6,868,643 B1 | 3/2005 | Williams |
| 6,893,752 B2 | 5/2005 | Veeramasuneni et al. |
| 7,364,015 B2 | 4/2008 | Englert et al. |
| 7,662,221 B2 | 2/2010 | Fay |
| 8,092,858 B2 | 1/2012 | Smith |
| 2004/0209074 A1 | 10/2004 | Randall et al. |
| 2005/0246993 A1 | 11/2005 | Colbert et al. |
| 2006/0177649 A1* | 8/2006 | Clark ...................... B05D 5/06 |
| | | 428/335 |
| 2007/0178793 A1 | 8/2007 | Gerello |
| 2007/0269660 A1 | 11/2007 | Killilea et al. |
| 2008/0001900 A1 | 1/2008 | Park |
| 2008/0190062 A1 | 8/2008 | Engbrecht et al. |
| 2010/0143682 A1 | 6/2010 | Shake et al. |
| 2010/0304126 A1 | 12/2010 | Wu et al. |
| 2012/0088114 A1 | 4/2012 | Rohlf et al. |
| 2012/0172468 A1 | 7/2012 | Blackburn et al. |

FOREIGN PATENT DOCUMENTS

| | | |
|---|---|---|
| CL | 1952-2006 | 11/2006 |
| CL | 49738 | 10/2009 |
| CL | 51195 | 11/2009 |
| CL | 53206 | 6/2012 |
| JP | 2005171734 A | 6/2005 |
| NZ | 556750 A | 12/2010 |
| TW | 200736475 | 10/2007 |
| TW | 201018768 | 5/2010 |

OTHER PUBLICATIONS

Zip Roofing Panels, Roofing System, Roof Sheating, Zip System Wall Sheathing, Plywood Roof Sheathing/Huber Engineered Woods; http://www.huberwood.com/zipsystem/products/zip-system-roof; Aug. 4, 2015.
First Examination Report dated Jul. 25, 2019 for New Zealand Application No. 712569.

\* cited by examiner

EXTERIOR SHEATHING PANEL WITH INTEGRATED AIR/WATER BARRIER MEMBRANE

CROSS-REFERENCE TO RELATED APPLICATIONS

This patent application is a divisional patent application of U.S. patent application Ser. No. 14/198,093 filed Mar. 5, 2014 which is now U.S. Pat. No. 10,562,271 issued on Feb. 18, 2020 and which claims its priority to U.S. provisional patent application 61/792,545 filed Mar. 15, 2013, the entire disclosures of which are expressly incorporated herein by reference.

FIELD OF THE INVENTION

This invention relates to a building exterior sheathing panel with an integrated air/water barrier membrane and methods for manufacturing and installing the panel.

BACKGROUND

The premise of an air/water barrier as part of a building envelope barrier system is to stop the unintended passage of air, water, and other elements into and out of a building enclosure. Exterior air/water barrier sheet membranes were first introduced into the industry, but there are several problems associated with installing sheets in the field because the seams are such critical junctures. Installation of the sheets does not always match the instructions provided by the manufacturer. Environmental conditions (e.g., wind, temperature, rain, etc.) can create significant obstacles for the successful installation of sheet materials. Moreover, the sheet backing typically provides a poor bonding surface for other construction materials, thereby making sheets difficult to adhere.

Fluid-applied air/water barrier membranes are newer to the industry and are gaining acceptance as an alternative to sheet membrane barrier products. Fluid-applied membrane barrier products are faster to install than sheet membrane barrier products at the jobsite. The typical installation crew requirements are smaller than with sheet membrane barrier installations. Fluid-applied membranes are typically spray applied on the jobsite, which greatly increases the production rate compared to the application of sheet membranes. However, issues with the application can occur, such as an incorrect amount of material being applied due to applicator error, equipment problems, and/or environmental conditions (e.g., wind, temperature, rain, etc.). Such issues impact not only the quality and durability of the air/water barrier installation but can also incur significant additional costs to clean up and repair damage to adjacent buildings and cars due to overspray.

Conventional methods for installation of the exterior sheathing, air barrier and water resistant barrier requires separate crews which accomplish installation around the building perimeter in several steps: to install the sheathing first, then finish the joints on the second round, and then install the water resistant barrier and the air barrier yet in the next and separate round.

Thus, there continues to be a need for providing an air/water barrier membrane that minimizes problems associated with installation. There also continues to be a need for building panels coated with an air/water barrier membrane under controlled conditions during manufacturing.

It will be appreciated that this background description has been created by the inventors to aid the reader and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims and not by the ability of any disclosed feature to solve any specific problem noted herein.

SUMMARY

In one aspect, the present disclosure is directed to embodiments of a building cementitious panel which prevents water penetration and air leakage.

One embodiment is directed to a cementitious panel comprising a cementitious core, at least one cover sheet and an integrated air/water barrier membrane. In the panel, a cover sheet is sandwiched between the cementitious core and the integrated air/water barrier membrane. The cementitious core may comprise a calcium sulfate material, Portland cement or a combination of the two. The panel may include a second cover sheet and in this embodiment, a cementitious core is sandwiched between the first cover sheet and the second cover sheet, and the first cover sheet is sandwiched between the cementitious core and the integrated air/water barrier membrane.

In some embodiments, the cementitious panel includes a paper sheet or a fibrous mat as a cover sheet. Various fibers can be used in the mat, including without limitation polymeric and mineral fibers.

In some embodiments, an exterior sheathing panel comprises an integrated air/water barrier membrane which includes from 30 to 70% by weight of a polymeric binder selected from the group consisting of a polyacrylate, polyurethane, silicone emulsion, polystyrene, styrene/acrylic copolymers and combinations thereof, and from 20 to 50% by weight of calcium carbonate. The integrated air/water barrier membrane may further include at least one of the following: a dispersant, defoamer, pigment, thickener, preservative, pH adjuster, emulsion stabilizer, wetting and leveling agent, cross linker and combinations thereof.

Further embodiments include an exterior sheathing panel in which an integrated air/water barrier membrane has a dried thickness in the range from 10 to 90 mils.

In some embodiments, an antimicrobial/antifungal agent is added to a cementitious core, a cover sheet and/or an integrated air/water membrane. Suitable antimicrobial agents include 2-(4-thiazolyl) benzimidazole, silver zeolyte, zinc oxide and zinc pyrithione.

Further embodiments provide an in-plant method of manufacturing an exterior sheathing panel with an integrated air/water barrier membrane. The method comprises preparing a slurry with a cementitious material; sandwiching the slurry between two cover sheets; allowing the slurry to set and form a cementitious panel; spray coating the cementitious panel on at least one surface with an integrated air/water barrier membrane formulated with a polymeric binder and calcium carbonate; and conditioning the spray-coated cementitious panel in an oven wherein the panel is exposed to at least two different temperature zones.

DETAILED DESCRIPTION

The present disclosure provides various embodiments of an exterior sheathing panel that is physically integrated with an air/water barrier membrane to provide a unique barrier component. An integrated air/water barrier membrane sheathing panel can provide an easy to install single panel that eliminates the need to individually install separate air and water resistant barriers at the jobsite. By doing so, the number of steps required to complete the building envelope are reduced and the number of joints that must be individually sealed are reduced, substantially reducing the time and labor required to meet the air/water barrier system performance requirements for a building enclosure. This disclosure also provides embodiments related to methods in which exterior sheathing panels with air/water barrier membranes are mass produced with uniform and monolithic barrier properties in a controlled factory environment, thus reducing problems associated with having an insufficient amount of barrier material applied in the field. Additionally, applying the air/water barrier membrane to the exterior sheathing in a controlled, automated factory setting as provided in this disclosure ensures that the membrane application is not subject to the vicissitudes of weather/environmental variability or worker fatigue, thereby providing a consistent coating thickness with optimal adhesion bond between the air/water barrier membrane and the sheathing substrate.

Figure 1:
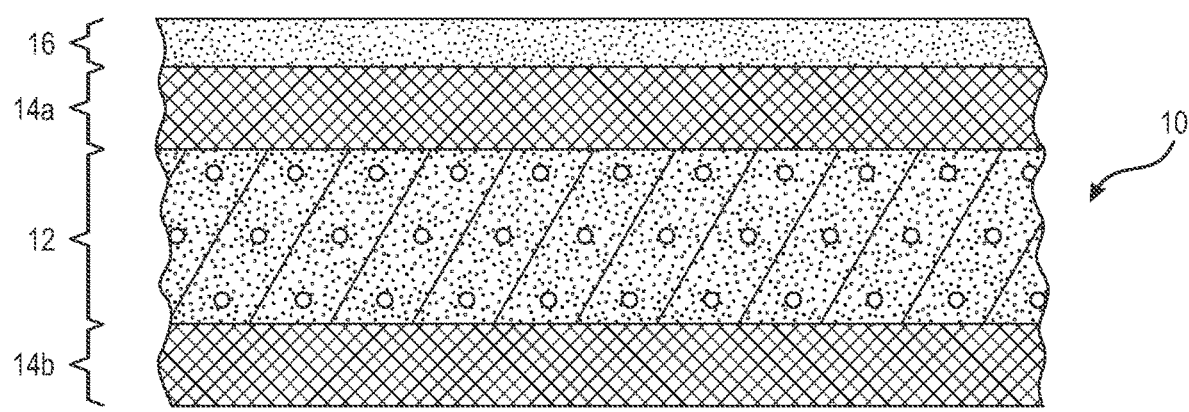
FIG. 1 is a fragmentary cross-section of the present exterior sheathing panel with an integrated air/water barrier membrane.

In particular, in some embodiments, a cementitious exterior sheathing panel comprises an adhesive fluid-applied air/water barrier on at least one surface of the panel. Referring to FIG. 1, some embodiments include an exterior sheathing panel with an integrated air/water barrier membrane, generally designated 10. The panel includes a cementitious core 12; a cover sheet 14a and an optional cover sheet 14b, and an air/water barrier membrane 16. The cementitious core 12 is sandwiched between cover sheets 14a and 14b. The cover sheet 14a is overlaid with the air/water barrier membrane 16 such that the cover sheet 14a is sandwiched between the cementitious core 12 and the integrated air/water barrier membrane 16.

A cementitious sheathing panel can be comprised of any suitable inorganic core material intended for exterior applications. In particular, the core can be comprised of any cementitious material, substance, or composition, along with any suitable additives. Non-limiting examples of materials that can be used in the cementitious core include: Portland cement; sorrel cement; slag cement; fly ash cement; calcium alumina cement; water-soluble calcium sulfate anhydrite; calcium sulfate α-hemihydrate; calcium sulfate β-hemihydrate; natural, synthetic, or chemically-modified calcium sulfate hemihydrates; calcium sulfate dihydrate ("gypsum," "set gypsum," or "hydrated gypsum"); and mixtures thereof. As used herein, the term "calcium sulfate material" refers to any of the forms of calcium sulfate referenced above. In certain preferred embodiments, the cementitious core comprises a calcium sulfate material, Portland cement, or a mixture thereof. Preferably the cementitious core comprises gypsum.

Examples of suitable cementitious exterior sheathing panels for use in embodiments of the present disclosure include, e.g., those commercially-available from United States Gypsum, Chicago, Ill., under the trade names SHEETROCK®, SHEETROCK FIRECODE®, SECUROCK®, FIBEROCK®, and DUROCK®.

The cementitious core can comprise additives, such as any additives commonly used to produce cementitious articles (e.g., gypsum board or cement board). Suitable additives include, without limitation, structural additives such as mineral wool, continuous or chopped glass fibers (also referred to as fiberglass), perlite, clay, vermiculite, calcium carbonate, polyester, and paper fiber. Chemical additives include, e.g., foaming agents, fillers, accelerators, sugar, enhancing agents (e.g., phosphates, phosphonates, borates), retarders, binders (e.g., starch and latex), colorants, fungicides, and biocides. Examples of the use of some of these and other additives are described, for instance, in U.S. Pat. Nos. 6,342,284; 6,410,118; 6,632,550; 6,800,131; 5,643,510; 5,714,001; and 6,774,146, and U.S. Patent Application Publication Nos. 2004/0231916; 2002/0045074; and 2005/0019618, which disclosures are hereby incorporated herein by reference. In certain embodiments, the cementitious core further comprises metal fibers, cellulose fibers, mineral fibers, glass fibers, polymer fibers, carbon fibers, or a combination thereof.

The cementitious core is covered by at least one substrate, and in some embodiments by two substrates, in an overlying manner relative to the core on opposing faces thereof. In other words, the cementitious core is sandwiched between two substrates. The substrate can be a cover sheet, such as a paper cover sheet or a mat, for example. Various types of paper cover sheets are known in the art (e.g., manila, kraft, polymer, etc.) and all such types of paper cover sheets may be used in the present invention. Multi-ply papers can be used in various embodiments. If desired, the paper cover sheet can be treated with a chemical or physical additive to impart a property, such as water-proof, fire-proof, antifungal, and/or antimicrobial properties. In some embodiments, the cover sheet is a paper cover sheet having a weight of about 40 to about 65 lb/msf (thousand square feet).

In other embodiments, cover sheets comprising fibrous mats are used. The mat can comprise any suitable type of polymer fiber, mineral fiber, or combination thereof. Non-limiting examples of suitable fibers include glass fibers, polyamide fibers, polyaramide fibers, polypropylene fibers, polyester fibers (e.g., polyethylene terephthalate (PET)), polyvinyl alcohol (PVOH), polyvinyl acetate (PVAc), cellulosic fibers (e.g., cotton, rayon, etc.), and combinations thereof. Furthermore, the fibers of the mat can be hydrophobic or hydrophilic, coated or uncoated. The choice of fibers will depend, in part, on the type of application in which the cementitious sheathing panel is to be used. For example, when the sheathing panel is used for applications that require heat or fire resistance, appropriate heat or fire resistant fibers should be used in the fibrous mat.

The fibrous mat can be woven or non-woven. Non-woven mats comprise fibers bound together by a binder. The binder can be any binder typically used in the mat industry. Suitable binders include, without limitation, urea formaldehyde, melamine formaldehyde, stearated melamine formaldehyde, polyester, acrylics, polyvinyl acetate, urea formaldehyde or melamine formaldehyde modified or blended with polyvinyl acetate or acrylic, styrene acrylic polymers, and combinations thereof. Suitable fibrous mats include commercially available mats used as facing materials for the cementitious exterior sheathing panels.

The integrated panel can be prepared by any suitable method. In general, an adhesive fluid-applied air/water barrier is applied to at least one surface (e.g., the exterior facing surface) of a cementitious exterior sheathing panel. The adhesive fluid can be any suitable composition, and is in the form of a liquid polymer formulation in some embodiments. An applying step can comprise any suitable method of adding the liquid polymer formulation to a surface of the sheathing panel. Such methods are known in the art and include, e.g., spraying, rolling (e.g., pressure rolling), troweling, brushing, wiping, dipping, soaking, and/or impregnating the surface of the panel with the liquid polymer formulation. Once applied, the liquid polymer formulation dries, solidifies, hardens, and/or cures on the surface to provide an adhesive layer that has air- and/or moisture-proof properties. This step can be performed at room temperature or at an elevated temperature for a specified amount of time to achieve the desired level of tackiness.

The liquid polymer formulation can be any suitable material used in fluid-applied membranes. A suitable formulation for an air/water barrier formulation should meet or exceed the minimum requirements set forth by CAN/ULC-S741 ("Standard for Air Barrier Materials—Specification") and tested in accordance with by ASTM E2178 ("Standard Test Method for Air Permeance of Building Materials"). Such formulations include those that prevent or minimize air infiltration/exfiltration and water penetration through an exterior sheathing panel with an integrated air/water barrier membrane, while the panel still remains permeable to water vapor. Other suitable air/water barrier formulations include those that prevent or minimize air infiltration/exfiltration through the panel and also minimize permeability of the panel to water vapors.

In at least some embodiments, after drying and/or curing, the liquid polymer formulation forms a rubberized (elastomeric) membrane on at least one surface of an exterior sheathing panel.

At least in some embodiments, the liquid polymer formulation comprises one or more materials (e.g., polymers) that serve as a polymer binder and provide a self-gasketing effect after the formulation has dried and/or cured. Non-limiting examples of the liquid polymer formulation suitable for an exterior sheathing panel with an integrated air/water barrier membrane include polyacrylate (e.g., polymers and copolymers based on methacrylate, ethyl acrylate, ethyl methylacrylate, butylacrylate, butyl methacrylate, 2-chloroethylvinyl ether, 2-ethylhexyl acrylate, and hydroxyethyl methacrylate), polystyrene, polybutadiene, poly(butadiene co-styrene), polyisoprene, polyacrylonitrile butadiene, polychloroprene, polyvinyl acetate, polyvinyl chloride, polyurethane, polyvinyl acetate, silicone emulsion, and combinations thereof. Examples of fluid-applied membranes are exemplified by, e.g., U.S. Pat. Nos. 8,151,537 and 7,662,221, which disclosures are hereby incorporated by reference herein.

In certain embodiments, the liquid polymer formulation is in the form of a liquid emulsion (e.g., a liquid polymer emulsion), such as a water-based elastomeric emulsion (e.g., a water-based acrylic emulsion) or an oil-based elastomeric emulsion (e.g., a rubberized (elastomeric) emulsion). Solvents used in the emulsion can be water, organic solvent, or a combination thereof. Examples of organic solvent include mineral spirits, mineral oil, xylene, and naphtha.

At least in some embodiments, an exterior sheathing panel with an integrated air/water barrier membrane comprises a membrane which was prepared from a formulation comprising an acrylic emulsion. At least in some embodiments, an exterior sheathing panel with an integrated air/water barrier membrane comprises a membrane with 5 to 80 wt % of a polyacrylate. At least in some embodiments, an exterior sheathing panel with an integrated air/water barrier membrane comprises a membrane with 30 to 70 wt % of a polyacrylate. At least in some embodiments, an exterior sheathing panel with an integrated air/water barrier membrane comprises a membrane with 40 to 60 wt % of a polyacrylate.

At least in some embodiments, an exterior sheathing panel with an integrated air/water barrier membrane comprises a membrane prepared from a formulation comprising polyurethane. At least in some embodiments, an exterior sheathing panel with an integrated air/water barrier membrane comprises a membrane comprising 5 to 50 wt % of polyurethane. At least in some embodiments, an exterior sheathing panel with an integrated air/water barrier membrane comprises a membrane comprising 10 to 40 wt % of polyurethane. At least in some embodiments, an exterior sheathing panel with an integrated air/water barrier membrane comprises a membrane which comprises a combination of polyurethane with another polymer selected from at least one of the following silicone and a polyacrylate. At least in some embodiments, an exterior sheathing panel with an integrated air/water barrier membrane comprises a membrane which comprises a styrene co-polymer.

It was unexpectedly discovered that preferred polymeric binders for an integrated air/water barrier membrane in an exterior sheathing panel include acrylic latexes, acrylic styrene co-polymers and styrene-butadiene dispersions. These polymeric binders can be used in the amount from 30 to 70%. In some embodiments, a polymeric binder can be selected from the following commercially available binders: PLIOTEC EL-25 (Acrylic Elastomeric Latex) from Omnova, ACRONAL S400 (Aqueous Plasticizer-Free Copolymer Dispersion of Acrylic Acid Ester and Styrene) from BASF, UCAR 9176 (Styrene Acrylic Copolymer) from DOW, RHOPLEX 2620 (100% Acrylic Polymer) from DOW or BUTONAL NS 175 (High Solids, Cold Polymerized Anionic Styrene-Butadiene Dispersion) from BASF.

In some embodiments, an exterior sheathing panel with an integrated air/water barrier membrane comprises a membrane which was prepared from a formulation comprising a polymer emulsion and a dispersant. Various dispersants can be used to stabilize the emulsion, such as polyvinyl alcohols, cellulose and derivatives thereof, vinylpyrrolidone-containing copolymers, ethoxylated mono-, di- and trialkylphenols, ethoxylated fatty alcohols and alkali metal and ammonium salts of alkyl sulfates of sulfuric acid, monoesters of ethoxylated alkanols and of ethoxylated alkylphenols of alkylsulfonic acids and of alkylarylsulfonic acids, the alkali metal and/or ammonium salts of dodecylbenzenesulfonic acid, and the alkali metal and/or ammonium salts of the sulfuric acid monoester of ethoxylated dodecanol. Dispersants can be added to the formulation in an amount from about 0-10 wt % (e.g., between about 1-9 wt %, between about 2-7 wt %, between 3-6 wt %).

In some embodiments, a suitable dispersant includes solution of a high molecular weight block copolymer with pigment affinic groups, solution of an ammonium salt of an acrylate copolymer, anionic polyelectroyte, potassium tripolyphosphate and alkylol ammonium salt of a copolymer with acidic groups. These dispersants can be used in the amount from 0-10% and preferably from 0.1-5%. In some embodiments, a dispersant can be selected from the following commercially available dispersants: DISPERBYK-190 (solution of a high molecular weight block copolymer with pigment affinic groups) from BYK, BYK-156 (solution of an ammonium salt of an acrylate copolymer) from BYK, TAMOL 851 (anionic polyelectroyte) from DOW, Potassium Tripolyphosphate (triphosphoric Acid, pentapotassium salt) from INNOPHOS, DISPERBYK-180 (alkylol ammonium salt of a copolymer with acidic groups) from BYK.

In some embodiments, an exterior sheathing panel with an integrated air/water barrier membrane comprises a membrane formulated with one or more additives to further enhance the performance of the barrier material. Suitable additives include, e.g., petroleum asphalt, limestone, calcium carbonate, a silane (e.g., diaminosilane, trimethoxy vinylsilane), a glycol (e.g., ethylene glycol, propylene glycol, dipropylene glycol monobutyl ether), a tackifier (e.g., a rosin or rosin derivative, such as wood rosin, a terpene or modified terpene, an aliphatic, cycloaliphaticm or aromatic resin), an adhesion promoter, a curing catalyst, a crosslinking agent, a termiticide, a fungal growth inhibiting agent (e.g., 2-(4-thiazolyl) benzimidazole, silver zeolyte, zinc oxide and zinc pyrithione), a filler (e.g., kaolin clay, mica, heavy spar, talc, sand, quartz flour, chalk, titanium dioxide, silica, fly ash), and/or a phase change material.

In some embodiments, an exterior sheathing panel with an integrated air/water barrier membrane comprises a membrane formulated with a polymeric binder described above and calcium carbonate which can be used in the amount from 20 to 50% by weight. Suitable commercial sources of calcium carbonate include, but are not limited to, THIXOCARB 500™ (Precipitated Calcium Carbonate) from Specialty Minerals, ULTRAFLEX 100™ (Precipitated Calcium Carbonate) from Specialty Minerals, HUBERCARB Q6™ (Calcium Carbonate) from Huber Engineered Materials, OMYACARB 100-PT™ (Calcium Carbonate) from Omya, HUBERCARB Q325™ (Calcium Carbonate) from Huber Engineered Materials and NEOLIGHT SS™ (Precipitated Coated Calcium Carbonate) from Takehara Kagaku Kogyo Co.

In some embodiments, an exterior sheathing panel with an integrated air/water barrier membrane comprises a membrane formulated with a polymeric binder as described above, calcium carbonate and at least one or more additives such as a defoamer, pigment, thickener, preservative, pH adjuster, emulsion stabilizer, wetting and leveling agent and cross linker.

In some embodiments suitable defoamers include, but are not limited to a mixture of paraffinic mineral oils and hydrophobic components, molecules compounded in an enhanced mineral-oil system, a solution of a polyether-modified polydimethylsiloxane, and a mixture of foam-destroying polysiloxanes and hydrophobic solids in polyglycol. These defoamers can be used in the amount from 0.1 to 5%. Suitable commercial sources for a defoamer include BYK-033™ (mixture of paraffinic mineral oils and hydrophobic components) from BYK, FOAMSTAR ST 2410™ aka. FOAMSTAR A10™ (molecule compounded in an enhanced mineral-oil system) from BASF, BYK-019™ (solution of a polyether-modified polydimethylsiloxane) from BYK, BYK-021™ (mixture of foam-destroying polysiloxanes and hydrophobic solids in polyglycol) from BYK.

In some embodiments suitable pigments include, but are not limited to, titanium dioxide, zinc oxide, carbon black, micronized precipitated silica, talc and combinations thereof. These pigments can be used in the amount from 0.1% to 10% by weight. Suitable commercial sources for a pigment include HUNTSMAN TR93™ (Titanium Dioxide) from Maroon Inc., ZOCO 101™ (Zinc Oxide) from Zochem Icc., SOLTEX ACE BLACK™ (Carbon Black) from Soltex, ZEOTHIX 265™ (Micronized precipitated silica) from Huber, and SIERRALITE 402S™ (Talc) from Imerys.

In some embodiments suitable thickeners include, but are not limited to, at least one of the following: hydroxyethylcellulose, acrylic thickener, anionic inverse emulsion thickener, HASE, and hydrophobically modified alkali swellable acrylic emulsion. These thickeners can be used in the amount from 0.1% to 5% by weight. Suitable commercial sources for a thickener include NATROSOL 250 HBR™ (Hydroxyethylcellulose) from Ashland Inc., ACRYSOL ASE-95NP™ (Alkali Soluble, Acrylic Thickener) from DOW, TEXIPOL 63-510™ (Anionic Inverse Emulsion Thickener) from Scott Bader, POLYPHOBE 106HE™ (HASE) from Arkema, and SOLTHIX A100™ (Hydrophobically Modified Alkali Swellable Acrylic Emulsion) from Lubrizol.

In some embodiments suitable preservatives include, but are not limited to, at least one of the following: 2[(Hydroxymethyl)amino]-2-methylpropanol, 3-iodo-2-propynyl butyl carbamate, n-(3,4-Dichlorophenyl)-n,n-Dimethlyurea, 1,2 benzisothiazolin-3-one and tetrachloroisophthalonitrile. These thickeners can be used in the amount from 0.1% to 5% by weight. Suitable commercial sources for a thickener include TROYSAN 186™ (2[(Hydroxymethyl)amino]-2-methylpropanol) from Troy Corporation, POLYPHASE AF1 ™ (3-iodo-2-propynyl butyl carbamate) from Troy Corporation, POLYPHASE 663™ (n-(3,4-Dichlorophenyl)-n,n-Dimethlyurea) from Troy Corporation, MERGAL 758™ (1,2 benzisothiazolin-3-one) from Troy Corporation and NUOCIDE 404D™ (Tetrachloroisophthalonitrile) from Ashland Inc.

In some embodiments suitable pH adjusters include, but are not limited to, at least one of the following: calcium hydroxide, sodium hydroxide, potassium hydroxide, 30% aqua ammonia and 2-Amino-2-methyl-1-propanol. These pH adjusters can be used in the amount 0.1% to 5% by weight. Suitable commercial sources for a pH adjuster include Calcium Hydroxide (Calcium Hydroxide) from Jost Chemical, Caustic Soda (Sodium Hydroxide Solution) from OXYChem, Potassium hydroxide (Potassium Hydroxide) from Chem One Ltd., Ammonia Hydroxide Solution (30% Aqua Ammonia) from Tanner Industries, and AMP 95 (2-Amino-2-methyl-1-propanol) from Angus.

In some embodiments suitable emulsion stabilizers include, but are not limited to, at least one of the following: bentonite clay, a high molecular weight crosslinked copolymer of acrylic acid and C10-C30 alkyl acrylate, nonionic octylphenol ethoxylate surfactant, tall oil resin and natural resin extract. These emulsion stabilizers can be used in the amount from 0.1% to 5% by weight. Suitable commercial sources for an emulsion stabilizer include OPTIGEL LX™ (Bentonite Clay) from BYK, PEMUIEN 1622™ (a high molecular weight, crosslinked copolymer of acrylic acid and C10-C30 alkyl acrylate) from Lubrizol, TRITON X405™ (nonionic, octylphenol ethoxylate surfactant) from DOW Chemical Company, SYLVAROS™ NCY (Tall Oil Resin) from Arizona Chemical, and VINSOL™ SOAP (Natural Resin extract) Pinnova.

In some embodiments suitable wetting and leveling agents include, but are not limited to, at least one of the following: sulfosuccinate, polyether modified siloxane, urea modified polyurethane, modified urea ammonium salt of an acrylate copolymer. These wetting and leveling agents can be used in the amount from 0.1 to 5% by weight. Suitable commercial sources for a wetting and leveling agent include AEROSOL™ LF-4 (Proprietary Sulfosuccinate Blend) from Cytec, BYK-349 (Polyether Modified Siloxane), BYK-425 (Urea Modified Polyurethane), BYK-420 (Modified Urea), and BYK-154 (Ammonium Salt of an Acrylate Copolymer) from BYK.

In some embodiments suitable cross linkers include, but are not limited to, at least one of the following: zinc oxide, zinc metal ions, stabilized ammonium zirconium carbonate containing anionic hydroxylated zirconium polymers and epoxy functional silane. These cross linkers can be used in the amount from 0.1% to 5% by weight. Suitable commercial sources for a cross linker include Zinc Oxide (zinc Oxide) from US Zinc, ZIMPLEX™ 15 (Zinc metal ions) from Munzing, BACOTE™ 20 (clear alkaline solution of stabilized ammonium zirconium carbonate, containing anionic hydroxylated zirconium polymers) from Melchemical Inc., OXYLINK™ 3404 (Aqueous formulation of inorganic particles including zinc oxide) from Buhler Group, and SILANE™ A-187 (Epoxy functional silane) from Momentive.

In some embodiments, an exterior sheathing panel with an integrated air/water barrier membrane comprises a membrane formulated with a suitable polymer as described above and at least one of the following additives: petroleum asphalt, limestone, calcium carbonate, kaolin clay, mica, heavy spar, talc, sand, quartz flour, chalk, titanium dioxide, silica, fly ash, gypsum, or a combination of at least two of these additives. The additives may be used in different amounts, including from 20 to 80% by weight; from 25 to 75% by weight and from 30 to 60% by weight. In some embodiments, an exterior sheathing panel with an integrated air/water barrier membrane comprises a membrane formulated with a polyacrylate and at least one of the following additives: petroleum asphalt, limestone, calcium carbonate, kaolin clay, mica, heavy spar, talc, sand, quartz flour, chalk, titanium dioxide, silica, fly ash, gypsum, or a combination of at least two of these additives.

In some embodiments, an exterior sheathing panel with an integrated air/water barrier membrane comprises a membrane formulated with an anti-microbial and anti-fungal agent selected from 2-(4-thiazolyl) benzimidazole, silver zeolyte, zinc oxide and zinc pyrithione. An anti-microbial/anti-fungal agent can be used in various amounts, including from about 1 to about 10% by weight or from about 3 to about 7% by weight.

In some embodiments, an exterior sheathing panel with an integrated air/water barrier membrane comprises a membrane which comprises a pigment. Various pigments can be used, including chemical compounds that provide a black, brown, blue, green, red, yellow, orange or white pigment.

Examples of commercially-available fluid-applied air/water barriers include those marketed under the trade names: EXOAIR™ (Tremco), TYVEK™ (DuPont), R-GUARD™ (Prosoco), AIR-SHIELD™ (W. R. Meadows), STO-GUARD™ (Sto Corp.), and AIR BLOC™ (Henry Co.).

In some embodiments, an exterior sheathing panel with an integrated air/water barrier membrane comprises a membrane formulated with a polymer binder, calcium carbonate and other components as provided in Table 1 below.

TABLE 1

Integrated Air/Water Barrier Membrane Formulations

| Component | Commercial Source and Examples | Weight % Range |
|---|---|---|
| Polymeric Binder | OMNOVA's Pliotec EL-25 (Acrylic Elastomeric Latex) BASF's Acronal S400 (Aqueous Plasticizer-Free Copolymer Dispersion of Acrylic Acid Ester and Styrene) DOWs Ucar 9176 (Styrene Acrylic Copolymer) DOWs Rhoplex 2620 (100% Acrylic Polymer) BASF's Butonal NS 175 (High Solids, Cold Polymerized Anionic Styrene-Butadiene Dispersion) | 30-70% |
| Dispersant | BYK's DISPERBYK-190 (Solution of a high molecular weight block copolymer with pigment affinic groups) BYK's BYK-156 (Solution of an ammonium salt of an acrylate copolymer) DOW'S Tamol 851 (Anionic Polyelectroyte) INNOPHOS's Potassium Tripolyphosphate (Tripolyphosphoric Acid, Pentapotassium Salt) BYK's DISPERBYK-180 (Alkylol ammonium salt of a copolymer with acidic groups) | 0-5% |
| Defoamer | BYK's BYK-033 (Mixture of paraffinic mineral oils and hydrophobic components) BASF's FoamStar ST 2410 aka. FoamStar A10 (Molecule compounded in an enhanced mineral-oil system) BYK's BYK-019 (Solution of a polyether-modified polydimethylsiloxane) BYK's BYK-021 (Mixture of foam-destroying polysiloxanes and hydrophobic solids in polyglycol) | 0-5% |
| Pigment | MAROON INC.'s Huntsman TR 93 (Titanium Dioxide) ZOCHEM ICC.'s ZOCO 101 (Zinc Oxide) SOLTEX's Soltex Ace Black (Carbon Black) HUBER's Zeothix 265 (Micronized precipitated silica) IMERYS' Sierralite 402S (Talc) | 0-10% |
| Calcium Carbonate | SPECIALTY MINERALS's Thixo-Carb 500 (Precipitated Calcium Carbonate) SPECIALTY MINERALS's UltraFlex 100 (Precipitated Calcium Carbonate) HUBER ENGINEERED MATERIALS's Hubercarb Q6 (Calcium Carbonate) OMYA's Omyacarb 100-PT (Calcium Carbonate) HUBER ENGINEERED MATERIALS's Hubercarb Q325 (Calcium Carbonate) TAKEHARA KAGAKU KOGYO CO's Neolight SS (Precipitated Coated Calcium Carbonate) | 20-50% |
| Thickener | ASHLAND INC.'s Natrosol 250 HBR (Hydroxyethylcellulose) DOWs Acrysol ASE-95NP (Alkali Soluble, Acrylic Thickener) SCOTT BADER'S Texipol 63-510 (Anionic Inverse Emulsion Thickener) ARKEMA'S Polyphobe 106HE (HASE) LUBRIZOL's Solthix A100 (Hydrophobically Modified Alkali Swellable Acrylic Emulsion) | 0-5% |
| Preservative | TROY CORPORATION'S Troysan 186 (2[(Hydroxymethyl)amino]-2-methylpropanol) TROY CORPORATION'S Polyphase AF1 (3-iodo-2-propnynyl butyl carbamate) TROY CORPORATION'S Polyphase 663 (n-(3,4-Dichlorophenyl)-n,n-Dimethlyurea) TROY CORPORATION'S Mergal 758 (1,2 benzisothiazolin-3-one) | 0-5% |

TABLE 1-continued

Integrated Air/Water Barrier Membrane Formulations

| Component | Commercial Source and Examples | Weight % Range |
|---|---|---|
| pH Adjuster | ASHLAND INC.'s Nuocide 404D (Tetrachloroisophthalonitrile) JOST CHEMICAL'S Calcium Hydroxide (Calcium Hydroxide) OXYChem's Caustic Soda (Sodium Hydroxide Solution) CHEM ONE LTD.'s Potassium hydroxide (Potassium Hydroxide) TANNER INDUSTRIES's Ammonia Hydroxide Solution (30% Aqua Ammonia) ANGUS'S AMP 95 (2-Amino-2-methyl-1-propanol) | 0-5% |
| Emulsion Stabilizer | BYK's Optigel LX (Bentonite Clay) LUBRIZOL's Pemuien 1622 (a high molecular weight, crosslinked copolymer of acrylic acid and C10-C30 alkyl acrylate) DOW CHEMICAL COMPANY'S Triton X405 (nonionic, octylphenol ethoxylate surfactant) ARIZONA CHEMICAL'S SYLVAROS ™ NCY (Tall Oil Rosin) PINNOVA's Vinsol Soap (Natural Resin extract) | 0-5% |
| Wetting & Leveling Agent | CYTEC's Aerosol LF-4 (Proprietary Sulfosuccinate Blend) BYK's BYK-349 (Polyether Modified Siloxane) BYK's BYK-425 (Urea Modified Polyurethane) BYK's BYK-420 (Modified Urea) BYK's BYK-154 (Ammonium Salt of an Acrylate Copolymer) | 0-5% |
| Cross Linker | US zinc's Zinc Oxide (zinc Oxide) MUNZING's Zimplex 15 (Zinc metal ions) MELCHEMICAL INC.'s Bacote 20 (clear alkaline solution of stabilized ammonium zirconium carbonate, containing anionic hydroxylated zirconium polymers) BUHLER GROUP'S Oxylink 3404 (Aqueous formulation of inorganic particles including zinc oxide) MOMENTIVE's Silane A-187 (Epoxy functional silane) | 0-5% |

In some embodiments, an exterior sheathing panel with an integrated air/water barrier membrane is manufactured by a method that controls a thickness of the integrated air/water barrier membrane. The thickness can be controlled such that an exterior sheathing panel with an integrated air/water barrier membrane significantly reduces air infiltration/exfiltration and water penetration through the panel. Some embodiments provide an exterior sheathing panel with an integrated air/water barrier membrane which reduces air infiltration/exfiltration and water penetration through the panel by at least 50%. Some other embodiments provide an exterior sheathing panel with an integrated air/water barrier membrane which reduces air infiltration/exfiltration and water penetration through the panel by at least 70-80%. Exterior sheathing panels with an integrated air/water barrier membrane which sufficiently reduce air infiltration/exfiltration and water penetration include those panels in which a dried thickness of the integrated air/water barrier membrane is at least 10 mils, at least 20 mils, at least 30 mils, at least 40 mils, at least 50 mils, at least 60 mils, at least 70 mils; and less than 100 mils, less than 90 mils, less than 80 mils, less than 70 mils, less than 60 mils, less than 50 mils, less than 40 mils. The foregoing values can be combined in any suitable range using the upper and lower values, e.g., 10-90 mils, 20-80 mils, 40-80 mils, 60-80 mils, etc.

In order to obtain an exterior sheathing panel with an integrated air/water barrier membrane, the membrane formulation can be applied to the panel in a thickness of 5-100 mils (e.g., at least 5 mil, at least 10 mils, at least 20 mils, at least 30 mils, at least 40 mils, at least 50 mils, at least 60 mils, at least 70 mils; and less than 100 mils, less than 90 mils, less than 80 mils, less than 70 mils, less than 60 mils, less than 50 mils, less than 40 mils). The foregoing values can be combined in any suitable range using the upper and lower values, e.g., 10-90 mils, 20-80 mils, 40-80 mils, 60-80 mils, etc. Since the membrane (e.g., liquid polymer formulation) typically is applied as an emulsion, the initial layer is "wet." As the membrane dries, the thickness of the membrane layer will shrink depending on the concentration of the formulation. Accordingly, the dried thickness will be reduced in size from the initial wet thickness in an amount of about 10% or more (e.g., about 20% or more, about 30% or more, about 40% or more, about 50%).

In an embodiment, a cementitious exterior sheathing panel with an integrated air/water barrier membrane on at least one surface, as described above, further comprises a sheet membrane adhered to the integrated air/water barrier membrane. After the integrated air/water barrier membrane is formed on the panel, a sheet membrane with air- and/or moisture-resistant properties can be applied to the membrane. The sheet membrane can be applied to the integrated air/water barrier membrane using any suitable method, such as laying, rolling, laminating, calendering, and/or pressing. Typically the sheet membrane will be cut to a size commensurate with the cementitious exterior sheathing panel. The sheet generally can be cut prior to application to the panel, but in some embodiments, the sheet membrane is applied in roll form to a series of joined panels, which can then be cut to define single integrated panels.

In some embodiments, the integrated air/water barrier membrane typically has a sufficiently adhesive characteristic to secure the sheet membrane without additional adhesive (s).

In some embodiments, a system for installation of an exterior sheathing panel with an integrated air/water barrier membrane is provided. Such system may include one or more supplemental adhesive coatings and/or sealants which can be applied to the integrated air/water barrier membrane of the exterior sheathing panel. The additional adhesive can be applied over the entire surface of the panel or in select areas of the surface (e.g., the perimeter, the center, parallel edges, etc.). An additional adhesive can be any suitable material, such as those marketed under the trade names: EXOAIR™ (Tremco), TYVEK™ (DuPont), R-GUARD™ (Prosoco), AIR-SHIELD™ (W. R. Meadows), STO-GUARD™ (Sto Corp.), and AIR BLOC™ (Henry Co.). In some embodiments, suitable sealants include a polyurethane-based sealant such as SPECTREM 1™ (Tremco) and a silicone based sealant such as DYMONIC 100™ (Tremco). At least in some embodiments, an installation system includes an exterior sheathing panel with an air/water barrier membrane and at least one polyurethane-based and/or silicone based sealant.

While in some embodiments, an exterior sheathing panel with an integrated air/water barrier membrane can be used in combination with an additional sheet membrane, in other embodiments the exterior sheathing panel can be used without the sheet membrane. The sheet membrane with air- and/or moisture-resistant properties (also known as house or building wrap) can be any suitable material, such as those prepared from asphalt-impregnated paper or fiberglass, microperforated cross-lapped films, films laminated to spunbound nonwovens, films laminated or coated to polypropylene wovens, supercalendered wetlaid polyolefin (e.g., polyethylene) fibril nonwoven (e.g., TYVEK™), and drainable house wraps. In embodiments, a suitable sheet membrane can meet or exceed the minimum requirements set forth by ASTM E2178 ("Standard Test Method for Air Permeance of Building Materials"). Examples of sheet building wraps are shown and described in U.S. Pat. No. 7,148,160 and U.S. Patent Application Publication Nos. 2006/0040091 and 2006/0051560, e.g., which disclosures are hereby incorporated by reference herein. Examples of commercially-available sheet membranes include those marketed under the following trade names: Tri-Built Building Wrap (Tri-Built), TYVEK™ (DuPont), HARDIEWRAP™ (James Hardie), HYDROGAP™ (Benjamin Obdyke), WEATHERMATE™ (Dow), BLUESKIN™ (Henry Co.), FOILSKIN™ (Henry Co.), AIR-SHIELD™ (W. R. Meadows), and CERTA-WRAP™ (CertainTeed).

The integrated air/water barrier membrane, optionally in combination with a sheet membrane, enables the panel system (cementitious panel, integrated air/water barrier membrane, and optionally sheet membrane) with the versatile ability to adjust and/or alter the water vapor permeance rate of the panel. The ability to adjust the water vapor permeance rate of an air- and moisture-resistant cementitious exterior sheathing panel, while retaining a consistent panel thickness is particularly beneficial, depending on the designed and/or intended performance of the exterior building envelope. Based on a particular set of building science design principles concerning moisture management in wall assemblies and/or the geographical and climate region of use, the air- and moisture-resistant cementitious exterior sheathing panel may need to be fabricated having different water vapor permeance rates to address particular building energy performance requirements and/or building envelope designed performance. For example, the U.S. Department Of Energy describes seven (7) climate zones. Each of the seven zones is based on the extent of heating degree days (HDD) and cooling degree days (CDD). These metrics are used to classify how severe the heating and cooling conditions are for buildings in different regions of the country. For example, Climate Zone 1 (South Florida) has CDD>9000 and building space conditioning is dominated entirely by cooling. Conversely, in an area like the upper Midwest located in Climate Zone 6, building energy use is dominated by heating loads, with HDD greater than 7200 and less than 9000. Moisture and humidity conditions must also be considered during the design process. Humidity considerations have a major impact on optimizing the energy systems within housing, often dictating which materials or systems work best in terms of both energy performance and moisture control. For instance, in hot and dry climates, evaporative cooling systems can provide the space cooling for homes; typically using less energy than traditional vapor compression A/C systems. Meanwhile, in areas like the hot/humid Southeast, special attention must be given to the vapor permeability of exterior wall assemblies to prevent serious moisture and mold problems in the building envelope. Hence, the need for different water vapor permeance rates relating to air and moisture-proof cementitious exterior sheathing panels is of importance.

The water vapor permeance rate can be modified by adjusting the amount of the integrated air/water barrier membrane applied and/or by adjusting the designed water vapor permeance rate of the constructed optional sheet membrane which does not change in thickness while at the same can be intentionally constructed having different water vapor permeance rates. An exemplary method to modify and/or adjust the designed water vapor permeance rate of the air and moisture-proof cementitious exterior sheathing panel would be to provide a panel that remains dimensionally consistent in thickness. In practical applications where a consistent panel thickness is desired but different water vapor permeance rates desired, the integrated air/water barrier membrane would remain fixed, and the optional sheet membrane water vapor permeance rate altered to achieve a wide range of water vapor permeance rated air and moisture-resistant cementitious exterior sheathing panel types. The sheet membrane also prevents the integrated panels from adhering (blocking) to one another.

In another embodiment, a cementitious sheathing panel comprises an integrated air/water barrier membrane on at least one surface of the panel and a standoff material that is at least partially embedded in the membrane. The standoff material is any suitable material that can be embedded in the integrated air/water barrier membrane to prevent integrated panels from adhering (blocking) to one another. Given the rubberized nature of the membrane, the surface can remain tacky, even after drying and/or curing. As a result, a standoff material that physically prevents adjacent integrated panels from coming in contact with each other can be used to prevent adhesion and/or damage to the integrated panels.

In an embodiment, the standoff material is an open weave mesh. The mesh is prepared from any suitable material. For example, the mesh can comprise a natural or synthetic material (e.g., fiber), such as cotton, jute, sisal, wool, hemp, flax, bamboo, linen, glass, metal, nylon, polyethylene, polypropylene, acrylic, polyester, carbon fiber, and combinations thereof. If desired, the mesh material can have certain properties, such as fire-resistance, mold-resistance, water-resistance, and/or alkali-resistance, which are either intrinsic to the material or the result of a chemical additive and/or treatment.

To provide an anti-blocking property, the mesh should be of a thickness that is greater than the dried thickness of the membrane. The diameter of the strands of the mesh can be selected such that a portion of the mesh extends beyond the surface of the dried membrane. The size (tightness) of the weave is not particularly limited, but to save cost, the spacing between strands of the mesh can range from about 1 to 1.5 inches (about 2.54 to 3.81 cm). A more open weave also ensures that the mesh does not interfere with the self-gasketing effect provided by the membrane with respect to the fasteners used during installation of the integrated panel.

The mesh preferably is applied as a sheet that is commensurate with the size of the integrated panel. The mesh can be applied at any desirable stage to the membrane. For example, the membrane can be fully wet, partially dry, or fully dried, as long as the membrane retains a suitable amount of adhesiveness to allow the mesh to embed and be retained.

In another embodiment, the standoff material is a pellet or bead that is at least partially embedded in the membrane. The pellet or bead is any suitable material that provides an anti-blocking effect. The only real limitations are that the pellets or beads are made of a durable material and have a size (i.e., diameter or thickness) that is greater than the thickness of the dried membrane so that a portion of each pellet/bead extends beyond the surface of the dried membrane. Suitable materials include a polymer (e.g., polyethylene (including HDPE), polypropylene, polystyrene, polyvinylchloride, polyester, acrylic, rubber, and combinations thereof), wood, metal, and glass. The pellet/bead could also be formed from a hot-melt adhesive, such as those based on ethylene vinyl acetate copolymers, ethylene acrylate copolymers, polyester, polyethylene, and polypropylene.

The pellets/beads can be deposited in any suitable manner in order to allow the pellets/beads to embed themselves in the membrane. The pellets/beads can be applied at any desirable stage to the membrane. For example, the membrane can be fully wet, partially dry, or fully dried, as long as the membrane retains a suitable amount of adhesiveness to allow the pellets/beads to embed and be retained. In a preferred embodiment, the pellets/beads are deposited in a grid or array-like pattern over the entire span of the integrated panel. The frequency of the deposition of the pellets/beads is not particularly limited, as long as the anti-blocking property is maintained (e.g., a spacing of every 1 inch (2.54 cm), every two inches (5.08 cm), every three inches (7.62 cm), etc.). In a preferred embodiment, the placement of the pellets/beads does not interfere with the self gasketing effect provided by the membrane with respect to the fasteners used during installation of the integrated panel.

Further embodiments provide a method for manufacturing an exterior sheathing panel with an air/water barrier membrane. The method includes steps of preparing a cementitious slurry and fabricating a cementitious panel by sandwiching the slurry between two cover sheets. After the cementitious panel is set, it is coated with an air/water barrier membrane. In some embodiments, a cementitious panel is fabricated by sandwiching a cementitious slurry comprising gypsum between two fiberglass mats. After the cementitious panel is set, it is spray coated, roll coated or flood coated with an air/water barrier membrane which is formulated as provided in Table 1. There are many advantages to a method described above. When performed under controlled conditions including constantly monitored and maintained temperature, the method produces an exterior sheathing panel with an air/water barrier membrane with the consistent thickness, uniformity and even adhesive bond of the membrane to the cementitious panel.

It was unexpectedly discovered, that an exterior sheathing panel with an air/water barrier membrane as described above has excellent membrane-to-panel adhesive strength and performs very well in adhesive strength testing, including the standardized ASTM C297 test. Table 2 below shows ASTM C297 bond test results for an exterior sheathing panel with an air/water barrier membrane as described above and prepared by four different spray coating methods A through D (Method A-spray coating out of the middle of the panel; Method B—spray coating out of the coded edge; Method C—spray coating out of a 4 ft cross machine direction section; and Method D—hand sprayed with a hand held pump).

TABLE 2

| Adhesive Strength | | | | |
|---|---|---|---|---|
| Sample | Z-bonds - psi | | | |
| # | A | B | C | D |
| 1 | 26.5 | 32 | 20.25 | 37.75 |
| 2 | 24.75 | 35.5 | 33.25 | 28 |
| 3 | 16.25 | 39.75 | 30.25 | 30.25 |
| 4 | 25.25 | 29.25 | 33.25 | 42.75 |
| 5 | 25.75 | 32 | 33.25 | 36.5 |

TABLE 2-continued

| Adhesive Strength | | | | |
|---|---|---|---|---|
| Sample | Z-bonds - psi | | | |
| # | A | B | C | D |
| Avg | 23.7 | 33.7 | 30.05 | 35.05 |
| StanDev | 4.2 | 4.0 | 5.6 | 5.9 |

It was unexpectedly discovered that an exterior sheathing panel with an air/water barrier membrane as described above provides excellent membrane-to-panel adhesive strength and meets the minimum of 15 psi Z-directional tensile adhesive strength in the ASTM C297 bond test. As shown in Table 2 above, the average failure point for all panels is above 20 psi. Further, it was also unexpectedly discovered that the failure point for all panels in Table 2 is within the panel itself, i.e. between the glass-mat facer and the gypsum core.

It was also unexpectedly discovered that an exterior sheathing panel formulated with an air/water barrier membrane formulated according to Table 1 performs better than panels formulated with commercially available coatings such as EXOAIR™ 230, ICE™ coating, TREMGARD™ HB (all from Tremco) in various tests including adhesion, UV stability, air permeance, viscosity ease of spray application, surface tacking and blocking, and drying defects. Some comparative data is provided in Table 3 below.

TABLE 3

| Comparative Analysis | | | | |
|---|---|---|---|---|
| Characteristics | ExoAir 230 | ICE coating | Tremgard HB | The Inventive Formulation |
| Adhesion (Z-bond adhesion ≥ 15 psi) | Pass | N/A | N/A | Pass |
| UV stability (no surface cracking after 1000 hours QUV-A) | Pass | Pass | Pass | Pass |
| Vapor permeance (ASTM E-96) | Pass (11.71 Perms) | Fail (4.76 Perms) | Pass (12 Perms) | Pass (12.98 Perms) |
| Drying defect free (no blistering, cracking at 180° F. | Fail | N/A | Fail | Pass |
| Surface tack/ blocking (no blocking at 7.5 psi after 30 minutes) | Fail | N/A | Fail | Pass |
| Viscosity (ease of spray application) | Fail | N/A | Fail | Pass |
| VOC (as low as possible) | Fail (37 g/L) | Fail (14 g/L) | Fail (22 g/L) | Pass (8 g/L) |
| Nail Sealability (ASTM D-1970) | Pass | N/A | Pass | Pass |

It was also unexpectedly discovered that conditioning an exterior sheathing panel with an air/water barrier membrane in an oven prevents problems with panel blocking. Such conditioned panels have acquired an anti-blocking property and can be stock-piled without the need for mesh or other standoff material.

Figure 2A:
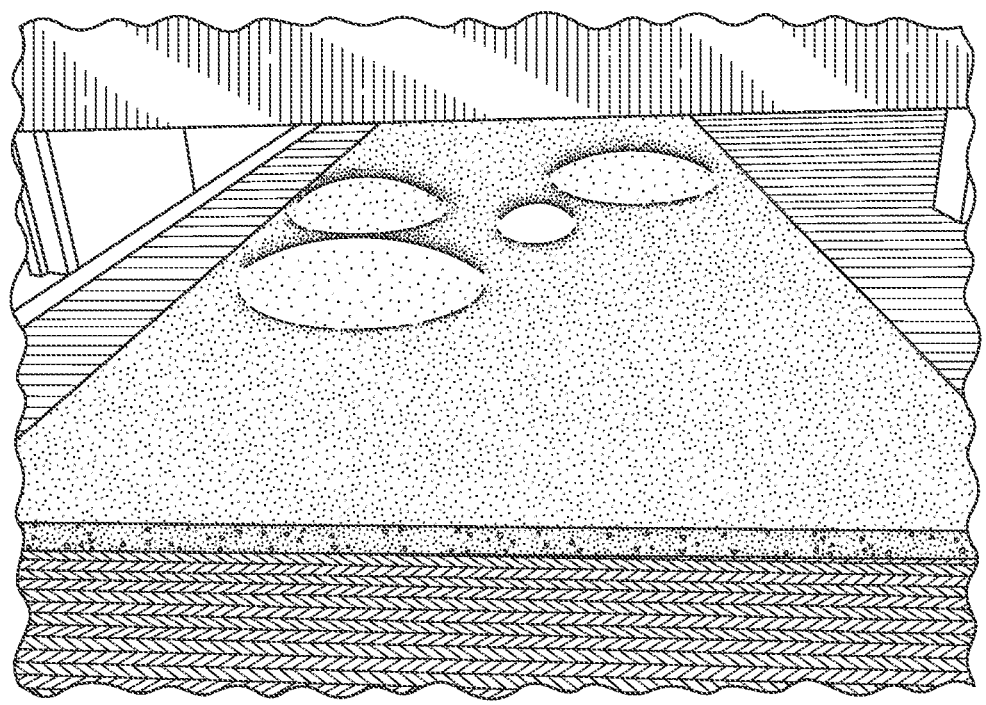
FIG. 2A depicts a control panel.
Figure 2B:
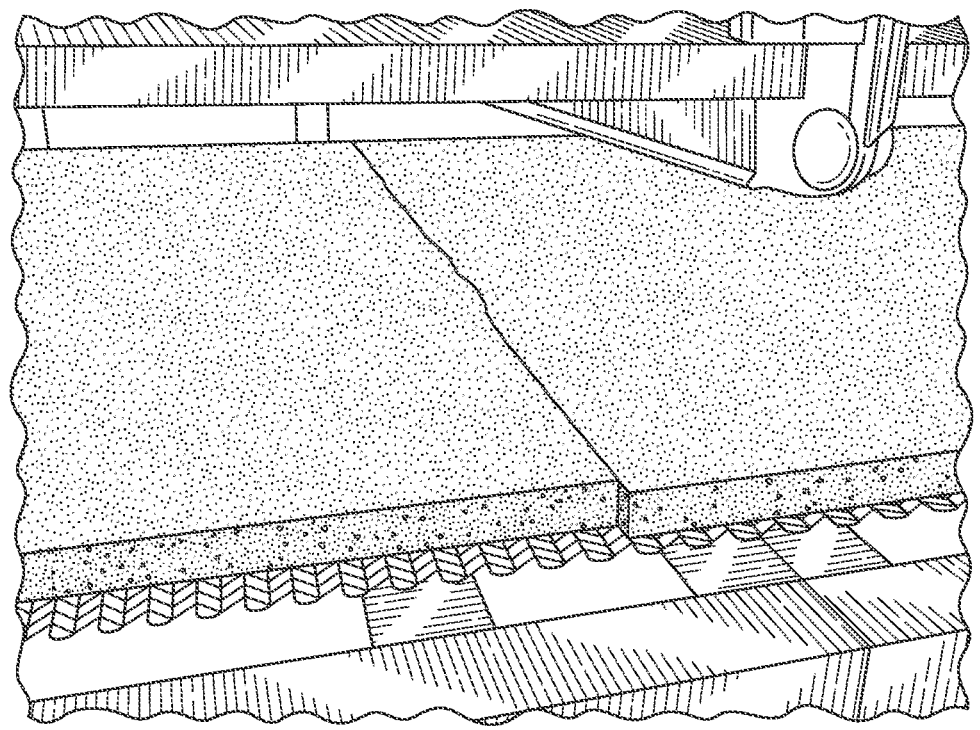
FIG. 2B depicts the present exterior sheathing panel with an integrated air/water barrier membrane obtained by the present method.

It was further unexpectedly discovered that the best results are achieved when the panel is conditioned in an oven with two different temperature zones. In some embodiments, it is preferred that the panel is first conditioned in a first temperature zone with a lower temperature and then moved into a second temperature zone in which the second temperature is higher than the first temperature in the first temperature zone. In some embodiments, the first temperature zone can be set up between 100 and 140° F. and the second temperature zone can be set up between 160 and 190° F. This conditioning method for obtaining an exterior sheathing panel with an integrated air/water barrier membrane with an anti-blocking property can be used for a panel with any integrated air/water barrier membrane described in this disclosure. In some embodiments, the conditioning method is used on an exterior sheathing panel with an integrated air/water barrier membrane formulated with a polymer binder and calcium carbonate as provided in Table 1. As shown in FIG. 2A, an integrated air/water barrier membrane formulated with a polymer binder and calcium carbonate as provided in Table 1 was subjected to conditioning in a higher temperature zone only. This panel developed blistering. Unlike the panel in FIG. 2a, a second integrated air/water barrier membrane formulated with a polymer binder and calcium carbonate as provided in Table 1 was subjected to conditioning by a two-zone method. As shown in FIG. 2B, this second panel did not develop blisters and had excellent anti-blocking property without the need for a mesh or any other additional treatment.

Any of the integrated panels described herein can be part of a system that includes an integrated panel that is adhered to one or more wall studs or ceiling joists via a fastener (e.g., a screw, a nail) with the integrated air/water barrier membrane as an outward facing material. Two adjacent panels are joined at the seams using a suitable joint tape and joint compound. If desired, an additional flashing layer can be added as a further air and water barrier. A cladding material (e.g., siding, shingle, stone) is further adhered to the exterior facing surface of the integrated panel. The entire system is designed to prevent the penetration of air and water through the panel to the interior of the structure.

All references cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Example 1

Manufacturing an Exterior Sheathing Panel with Integrated Air/Water Barrier Membrane A cementitious panel was prepared with a cementitious core comprising gypsum which was sandwiched between two fiberglass mats. The cementitious panel was allowed to set.

An air/water barrier membrane was formulated with a polymeric binder, calcium carbonate and an anti-fungal agent as shown in Table 1. The cementitious panel was spray coated with the air/water barrier membrane. A second control coated panel was prepared in parallel.

The first coated panel was conditioned in an oven at a first temperature zone at a temperature in the range from 100-140° F. and was then moved to a second temperature zone and further conditioned at a temperature in the range from 160 to 190° F.

The second control coated panel was conditioned in the same oven, but only in the second temperature zone at a temperature in the range from 160 to 190° F.

While the first coated panel was fully conditioned, had no blisters and had acquired an anti-blocking property as shown in FIG. 2B, the second control coated panel was covered with blisters of coating which was pilling off and the control panel was not properly conditioned as shown in FIG. 2A.

What is claimed is:

1. A method of manufacturing an exterior sheathing panel with an integrated air and water barrier membrane, the method comprising the following steps:
    coating a cementitious panel comprising a cover sheet, wherein the cover sheet is a fibrous mat with an exterior facing surface on at least the exterior facing surface with an integrated air and water barrier membrane formulated with 30 to 70% by weight of a polymeric binder comprising a polyacrylate, polyurethane, silicone emulsion, polystyrene, styrene acrylic copolymer or any combination thereof; 20 to 50% by weight of calcium carbonate; 0.1 to 5% by weight of a wetting and leveling agent; and 0.1 to 5% by weight of a cross linker; and
    conditioning the coated cementitious panel in an oven, wherein the coated cementitious panel is exposed to at least two different temperature zones, a first temperature zone and a second temperature zone, wherein the first temperature zone has a temperature lower than the second temperature zone.

2. The method of claim 1, wherein the temperature in the first temperature zone is in the range from 100° F. to 140° F. and wherein the temperature in the second temperature zone is in the range from about 160° F. to 190° F.

3. The method of claim 1, wherein the integrated air and water barrier membrane is applied by spray coating, roll coating and/or flood coating.

4. The method of claim 1, wherein the method further comprises:
    preparing a gypsum slurry;
    sandwiching the gypsum slurry between two cover sheets; and
    allowing the gypsum slurry to set, and thereby forming a cementitious panel.

5. The method of claim 1, wherein the integrated air and water barrier membrane is applied to the cementitious panel in a wet thickness of 5-100 mils.

6. The method of claim 1, wherein the integrated air and water barrier membrane is applied to the cementitious panel at a wet thickness calculated such that the application of the integrated air and water barrier membrane to the cementitious panel reduces water penetration through the cementitious panel by at least 50%.

7. The method of claim 1, wherein the integrated air and water barrier membrane is applied to the cementitious panel at a wet thickness calculated such that the application of the integrated air and water barrier membrane to the cementitious panel reduces water penetration through the cementitious panel by 70-80%.

8. The method of claim 1, wherein the method further comprises applying a sheet membrane over the integrated air and water barrier membrane after the integrated air and water barrier membrane is formed on the cementitious panel.

9. The method of claim 8, wherein the sheet membrane is applied by laying, rolling, laminating, calendering and/or pressing.

10. The method of claim 1, wherein the method further comprises embedding a standoff material in the air and water barrier membrane.

11. The method of claim 10, wherein the standoff material includes one or more of the following: an open weave mesh, a pellet or a bead.

12. The method of claim 1, wherein the fibrous mat comprises coated or uncoated fibers.

13. The method of claim 1, wherein the cementitious panel comprises a cementitious core containing a calcium sulfate material, Portland cement or a mixture thereof.

14. The method of claim 1, wherein the fibrous mat is woven or non-woven.

15. The method of claim 1, wherein the fibrous mat comprises polymer fibers, mineral fibers or a combination thereof.

16. The method of claim 1, wherein the integrated air and water barrier membrane further comprises at least one of the following additives: dispersant, defoamer, pigment, thickener, preservative, pH adjuster, emulsion stabilizer, or any combination thereof.

17. The method of claim 1, wherein the fibrous mat is non-woven and comprises fibers, and the fibers in the fibrous mat are bound together by a mat binder.

18. The method of claim 1, wherein the fibrous mat comprises glass fibers, wherein the glass fibers in the fibrous mat are bound together by a mat binder, and wherein the mat binder comprises one or more from the following: urea formaldehyde, melamine formaldehyde, stearated melamine formaldehyde, polyester, acrylics, polyvinyl acetate, urea formaldehyde or melamine formaldehyde modified or blended with polyvinyl acetate or acrylic, a styrene acrylic polymer, or any combination thereof.

19. The method of claim 1, wherein the wetting and leveling agent comprises at least one of the following: sulfosuccinate, polyether modified siloxane, urea modified polyurethane, or modified urea ammonium salt of an acrylate copolymer.

20. The method of claim 1, wherein the cross linker comprises at least one of the following: zinc oxide, zinc metal ions, stabilized ammonium zirconium carbonate containing anionic hydroxylated zirconium polymers, or epoxy functional silane.

* * * * *